US006635868B2

(12) United States Patent
Shiokawa et al.

(10) Patent No.: US 6,635,868 B2
(45) Date of Patent: Oct. 21, 2003

(54) MASS SPECTROMETRY APPARATUS

(75) Inventors: Yoshiro Shiokawa, Hachioji (JP); Megumi Nakamura, Fuchu (JP); Toshihiro Fujii, Hamura (JP)

(73) Assignee: Anelva Corporation, Tokyo (JP)

( * ) Notice: Subject to any disclaimer, the term of this patent is extended or adjusted under 35 U.S.C. 154(b) by 406 days.

(21) Appl. No.: 09/814,800

(22) Filed: Mar. 23, 2001

(65) Prior Publication Data

US 2002/0036263 A1 Mar. 28, 2002

(30) Foreign Application Priority Data

Mar. 24, 2000 (JP) ....................................... 2000-085394

(51) Int. Cl.[7] ........................... B01D 59/44; H01J 49/00
(52) U.S. Cl. ....................................... 250/288; 250/292
(58) Field of Search ................................ 250/281, 288, 250/292

(56) References Cited

U.S. PATENT DOCUMENTS

| | | | | | |
|---|---|---|---|---|---|
| 6,060,705 | A | * | 5/2000 | Whitehouse et al. | 250/288 |
| 6,060,706 | A | * | 5/2000 | Nabeshima et al. | 250/288 |
| 6,087,657 | A | * | 7/2000 | Kato | 250/288 |
| 2002/0020813 | A1 | * | 2/2002 | Shiokawa et al. | 250/288 |
| 2002/0053636 | A1 | * | 5/2002 | Shikawa et al. | 250/281 |

OTHER PUBLICATIONS

Analytical Chemistry, vol. 43, No. 12, p1720 (1971).
Analytical Chemistry, vol. 48, No. 6, p825 (1976).
Analytical Chemistry, vol. 56, No. 3, p396 (1984).
Analytical Chemistry, vol. 61, No. 9, p1026 (1989).
Journal of Applied Physics, vol. 82, No. 5, p2056 (1997).

* cited by examiner

*Primary Examiner*—Bruce Anderson
(74) *Attorney, Agent, or Firm*—Oliff & Berridge, PLC

(57) ABSTRACT

A mass spectrometry apparatus is provided with a mass spectrometry mechanism for analyzing the mass of ionized detected gas. The mass spectrometry apparatus is further provided with two ion sources, that is, a first ion source for attaching positive charge metal ions to cause ionization, and a second ion source for causing electrons to impact to cause ionization. Based on the configuration, it becomes possible to simultaneously or separately measure the molecular weight and analyze the molecular structure of the detected gas with a high sensitivity. The second ion source is positioned between the first ion source and the mass spectrometry mechanism and the detected gas is introduced into the first ion source. According to the above mass spectrometry apparatus, it is possible to measure the accurate molecular weight of the detected gas with a sufficient sensitivity and to simultaneously analyze the molecular structure with a sufficient sensitivity.

14 Claims, 8 Drawing Sheets

MASS SPECTROMETRY APPARATUS

BACKGROUND OF THE INVENTION

1. Field of the Invention

The present invention relates to a mass spectrometry apparatus, and more particularly to a mass spectrometry apparatus able to simultaneously or separately measure the molecular weight and analyze the molecular structure of a detected gas with a sufficient sensitivity.

2. Description of the Related Art

Measurement of the mass of gas molecules, which are electrically neutral, requires ionization of the gas molecules. The apparatus for ionizing the gas is called an "ion source". The ionized molecules (hereinafter referred to as "ions") enter the mass spectrometry mechanism. In the mass spectrometry mechanism, the ions are led into a specific electric field or magnetic field and move along a path in accordance with the mass of the ions due to the electrical field or magnetic field applied to the ions. As a result, different paths arise for each ion and only ions of a specific mass are detected.

Various ionization systems have been proposed in the past for the above ion source. For example, (1) electron impact ionization, (2) chemical ionization, (3) ionization by a composite of electron impact and chemical ionization, (4) atmospheric pressure ionization, (5) ionization by a composite of electron impact and atmospheric pressure ionization, and (6) ionization by ion attachment have been proposed. These ionization methods will be explained in brief below.

(1) Electron Impact Ionization

The electron impact ionization method is the method used most often for the ion sources of mass spectrometry apparatuses. In the ion source of the electron impact ionization method, the detected gas is introduced in an amount of $10^{-3}$ Pa and the molecules of the detected gas are impacted by hot electrons emitted from a hot filament to be accelerated to about 50 to 100 eV. The negative charge electrons are stripped from the gas molecules by the electron impact, whereby the gas molecules become positive charge ions. The electron impact ionization method is simple in terms of hardware and has the advantage of a small difference in ionization efficiencies resulting from the type of the molecules. The pressure in the ion source is usually $10^{-2}$ Pa or less, so as not to limit the movement of the electrons and ions. Note that the pressure in the mass spectrometry mechanism is usually $10^{-3}$ Pa or less. In the ion trap type, however, operation is possible even with $10^{-2}$ Pa.

The above electron impact ionization method has the feature of splitting (dissociating) molecules along with the ionization due to the excess energy of the electron impact when applied to a detected gas comprised of molecules with small energy of atomic bonds. Therefore, in this case, there is the advantage of obtaining effective information on the molecular structure. On the reverse side, there is the defect that it is not possible to obtain effective information on the molecular weight.

(2) Chemical Ionization

In an ion source of the chemical ionization method, a reaction gas of about 100 Pa (methane: $CH_4$ etc.) and a detected gas of about 1 Pa are introduced. First, the reaction gas is ionized by the electron emission and impact from the hot filament. Next, an ion and molecular reaction occurs between the ionized reaction gas and the detected gas. The detected gas is ionized to a positive charge or negative charge. The mechanism of ionization is extremely complicated and includes the phenomena of 1) the hydrogen ions in the ions of the reaction gas bonding with the molecules of the specimen, 2) hydrogen ions conversely being stripped from the detected gas, 3) charge movement, etc. Even in the chemical ionization method, when the hydrogen ions bond with the specimen molecules, disassociation often occurs in a detected gas with a weak bond energy. The chemical ionization method has the defect of a poor stability and reproducibility of the measurement values due to the complicated ionization mechanism. Further, it has the defect of a low measurement sensitivity.

(3) Ionization by Composite of Electron Impact and Chemical Ionization

There are two types of ion sources in this ionization method as shown in FIG. 11A and FIG. 11B and in FIG. 12. The configuration of FIG. 11A and FIG. 11B is a switching type. The configuration of FIG. 12 is a continuous type.

According to the switching type ion source shown in FIG. 11A and FIG. 11B, one of the electron impact ionization method (FIG. 11A) and the chemical ionization method (FIG. 11B) is selected and used by mechanical and electrical switching. FIG. 11A shows the state of operation in the case of electron impact ionization. An ion source including a filament 101 and a region 102 for electron impact and a condensing lens 104 are arranged in the same space 105. This space 105 is evacuated by a single vacuum pump 106. A carrier gas of He and the detected gas (specimen) are introduced to give a pressure of about $10^{-3}$ Pa. A partition 109 with an ion passage port 108 for passing the produced and condensed ions is provided at the front of the mass spectrometry mechanism 107. The mass spectrometry mechanism 107 is evacuated by another vacuum pump 110 so as to maintain the pressure of $10^{-4}$ Pa. FIG. 11B shows the state of operation in the case of chemical ionization. The filament 101 and the condensing lens 107 remain unchanged, but the electron impact region 102 where the electrons impact is generally surrounded by the partition 111. The electron impact region 102, however, also has an opening 112 such as the electron passage port. This does not mean that ports other than the ion passage port 113 are closed. The electron impact region 102 is evacuated by the vacuum pump 106 through the space 105 where the filament 101 and the condensing lens 104 are positioned. A reaction gas ($CH_4$) and a detected gas (specimen) are introduced into the electron impact region 102 to a pressure of 100 Pa. The ratio of the detected gas, however, is about 1%. Note that the pressure in the space around the electron impact region becomes $10^{-2}$ Pa. In the above composite method, there is the defect of the need for switching of the ion source itself and the introduced gas and poor operability. Therefore, while this system is possible in current GC/MS products, in almost all cases only the electron impact ionization method is used. The chemical ionization method is only used on a supplementary basis.

The continuous type ion source shown in FIG. 12 has a special structure designed especially for research (*Analytical*

*Chemistry,* vol. 43, no. 12 (1971), p. 1720). In this structure, it is possible to perform the electron impact ionization and the chemical ionization continuously or simultaneously. Exclusive filaments 201 and 202 for the ionization methods are provided. The electron impact regions 203 and 204 are also independent. There is however no condensing lens. The electron impact region 204 of the chemical ionization method is substantially surrounded by the partition 205. The ion source of the electron impact ionization method is positioned in the space around the electron impact region 204 of the chemical ionization method. These are evacuated by a single vacuum pump 206. A reaction gas and a 1% detected gas are introduced to give a pressure of 100 Pa in the electron impact region 205 of the chemical ionization method. The reaction gas and the detected gas are reduced in pressure $10^{-4}$ fold, that is, to about $10^{-2}$ Pa, while leaving the ratio the same, and flow to the ion source of the electron impact ionization method. Therefore, the partial pressure of the detected gas at the ion source of the electron impact ionization method becomes a low $10^{-4}$ Pa or so. The above composite system has the defects that not only does it ionize the reaction gas by the electron impact ionization method, but also the concentration of the detected gas is low and the sensitivity is poor. Therefore, products of this system have still not been commercialized. Note that in FIG. 12, elements substantially the same as elements explained with reference to FIG. 11A and FIG. 11B are given the same reference numerals and explanations thereof are omitted.

(4) Atmospheric Pressure Ionization

In this ion source, the carrier gas and a slight amount of the detected gas are introduced at atmospheric pressure ($1\times10^5$ Pa) and the sensitivity is improved. Since it has the following ionization mechanism, if the ratio of the detected gas to the carrier gas is 1% or less, the feature of the high sensitivity of this system does not appear. As the carrier gas, He, Ar, or another gas with a large ionization potential is selected. As the ionization mechanism, first, the carrier gas is ionized by the corona discharge from needle-shaped electrodes. Next, due to the exchange of charges between the ionized carrier gas and detected gas, electrons are stripped from the detected gas and the detected gas is ionized to a positive charge. Due to the exchange of charges from the carrier gas of the main ingredient, even if there is only a slight amount of the detected gas, the ratio of the ionized detected gas becomes high and as a result high sensitivity measurement becomes possible.

(5) Ionization by Composite of Electron Impact and Atmospheric Pressure Ionization This ion source is designed to make up for the defects of electron impact ionization and atmospheric pressure ionization and is a composite of the two systems as shown in FIG. 13. For example, there is the apparatus disclosed in Japanese Examined Patent Publication (Kokoku) No. 56-21096. The ion source 301 of the electron impact ionization method (EI) is positioned at the front of the mass spectrometry mechanism 302. These are evacuated by a single vacuum pump 303. There are two partitions 305 and 306 between the ion source 301 of the electron impact ionization method and the ion source 304 of the atmospheric pressure ionization (API). The center space is evacuated by a separate vacuum pump 307. A carrier gas (Ar) of the atmospheric pressure ($1\times10^5$ Pa) and the detected gas (specimen) are introduced into the ion source 304 of the atmospheric pressure ionization. The detected gas is introduced in a slight amount, for example, 0.1%, that is, about 100 Pa. The carrier gas and the detected gas are reduced in pressure $10^{-8}$ fold, that is, to about $10^{-3}$ Pa, through the two partitions 305 and 306, and flow into the ion source 301 of the electron impact ionization method. Therefore, the detected gas at the ion source 301 of the electron impact ionization method is raised in concentration by the design of the shape of the partitions, but the partial pressure is supposed to fall to about $10^{-5}$ Pa. In the above composite system, there are the same defects as the above-mentioned composite system of electron impact and chemical ionization. In the electron impact ionization method, not only is the carrier gas ionized, but also the concentration of the detected gas is low, so the sensitivity is poor. Therefore, even in products using this system, the electron impact ionization method is only used on a supplementary basis.

(6) Ionization by Ion Attachment

This ionization system makes use of the phenomenon that when an oxide of an alkali metal is heated, positive charge metal ions are emitted from the surface in the form of $Li^+$ or $Na^+$ etc. This ionization system includes the following three main methods:

The first method, as described by Hodge, *Analytical Chemistry,* vol. 48, no. 6, p. 825 (1976), obtains metal ions from an emitter comprised of a spherical alkali metal oxide attached to a filament and attaches them to the gas molecules for ionization. This method makes use of the phenomenon of gentle or soft attachment of ions to locations of concentrated charges in the gas molecules. The attachment energy is an extremely small one of about 0.43 to 1.30 eV/molecule. There is therefore less occurrence of disassociation. Further, the molecules as a whole are ionized by the attachment of ions. Note that this method is an indirect attachment method because the reaction gas (hydrocarbons etc.) and detected gas are introduced to the ion source, $Li^+$ is attached to the reaction gas once, then $Li^+$ is moved to the molecules of the detected gas.

The second method, as described by Bombick, *Analytical Chemistry,* vol. 56, no. 3, p. 396 (1984), is a direct attachment system which introduces only the detected gas to the ion source and causes $Li^+$ to directly attach to the molecules of the detected gas. Bombick simultaneously alludes to an apparatus combining the ion attachment ionization and electron impact ionization methods. In this composite apparatus, the emitter is inserted into the electron impact region of the chemical ionization method. The region where the ions are attached is generally surrounded by a partition and is evacuated by a vacuum pump through the space surrounding the position of the condensing lens. The pressure becomes about 10 Pa depending on the detected gas. When operating in the chemical ionization mode, the emitter is given a plus potential of about 5V, then the alkali metal oxide is heated to 5 to 600° C. to cause the emission of alkali metal ions. When operating in the electron impact ionization mode, the emitter is given a minus potential of −70V, then the filament is heated to about 1800° C. to cause the emission of hot electrons.

The third method, as described by Fujii, *Analytical Chemistry,* vol. 64, no. 7, p. 775 (1992), *Journal of Applied*

*Physics,* vol. 82, no. 5, p. 2095 (1997), etc., improves on the above method from the viewpoint of the detection of molecule peaks (no disassociation) and the measurement sensitivity and enables the examination of the limit of the measurement sensitivity and the measurement of extremely unstable radicals together with a plasma apparatus. FIG. 14 briefly shows the hardware configuration. In this apparatus, the ion source 403 is sealed by a partition 402 having no openings other than the ion passage port 401. There are two partitions 405 and 406 up to the mass spectrometry mechanism 404. The spaces 407, 408 and 409 are evacuated independently by pumps 410, 411 and 412. Therefore, even if the pressure of the ion source is made about 100 Pa and the ion passage ports of the partitions are made slightly larger, there is no problem in the operation of the mass spectrometry mechanism 404. In the ion attachment ionization method, due to the low attachment energy, if the excess energy is left as it is, there is a high possibility of the ions again separating from the molecules and disassociation occurring. To prevent this, the ion source is designed to make the pressure a relatively high one of about 100 Pa and quickly absorb the excess energy by impact with the gas. Further, to reduce the reaction (disassociation and cluster) at the emitter surface, the introduced gas is made mainly $N_2$ and the concentration of the detected gas is lowered. Note that metal ions do not easily attach to $N_2$, so this method is a direct attachment method.

Next, a brief explanation will be given of the mass spectrometry mechanism. The mass spectrometry mechanism acts to separate and detect the ion molecules by mass by an electric field and a magnetic field. The most general type of mass spectrometry mechanism is the quadrapole type mechanism called a "mass filter". In the quadrapole type mechanism, a unique quadrapole electric field is formed in the diametrical direction within four poles arranged in parallel to which a voltage with a superposed high frequency and direct current is applied. Only specific ions are stably oscillated. There is uniform (drift) motion in the axial direction, however, so only the specific ions pass through the quadrapole mechanism, are detected at the collector, and are taken out as a signal. The other unstably oscillated ions are absorbed by the electrodes part way.

Recently, a three-dimensional mass spectrometry mechanism (that is, ion trap type mechanism) using a principle similar to that of a quadrapole mechanism has been used as a new type of mass spectrometry mechanism. An ion trap mechanism is comprised of a single donut-shaped ring electrode and two hill-shaped end cap electrodes positioned on its axis. A high frequency voltage is applied to the ring electrode, while a direct current voltage is applied to the end cap electrodes. Due to this, an axially symmetric quadrapole electric field is formed inside. Mass spectrometry is possible at the same location without a drift motion. In the mass spectrometry, first, all ions are trapped, then specific ions are detected through the holes made in the end cap electrodes on the center axis as an unstable motion. This sequence is repeated.

In the above ion trap type mechanism, there are two types of structures relating the position of the ion source. The first is the general type for mass spectrometry apparatuses. This is an external ionization structure where the ion source is outside of the mass spectrometry mechanism and the ions are introduced into the mass spectrometry mechanism from the outside. The other is unique to ion trap types. This is an internal ionization structure where ionization takes place during the mass spectrometry. In the internal ionization structure, electrodes are directly driven into the space formed by the quadrapole electric field (case of electron impact type) and the ionization and mass spectrometry are performed at the same location. The filament is positioned at the side opposite to the detector. The electrons pass through the holes formed in the end cap electrodes on the center axis. Therefore, the second ion source is comprised by a filament, holes, and an impact region of the same space as the analysis region and can be said to be a composite of the mass spectrometry mechanism. Another feature of the ion trap type is that the operable voltage is higher by one order than other mass spectrometry mechanisms. It can also operate at $10^{-2}$ Pa. In the case of a light gas such as He, it is known that operation is also possible at $10^{-1}$ Pa and the resolution and sensitivity are conversely improved. As a detected gas, however, $10^{-2}$ Pa is supposed to be the de facto limit.

In recent years, in gas analysis using the practical mass spectrometry apparatuses, it has been demanded to accurately measure gas molecules with a sufficient sensitivity and further analyze the molecular structure with a sufficient sensitivity. According to the various ionization methods described above, however, it was not possible to satisfy this demand as shown in Table 1.

TABLE 1

| | Molecular weight | Molecular structure | Sensitivity |
|---|---|---|---|
| Electron impact ionization | Poor | Good | Fair |
| Chemical ionization | Fair | Poor | Poor |
| Atmospheric pressure ionization | Poor | Poor | Good |
| Ion attachment ionization | Good | Poor | Fair |

Further, even in apparatuses combining the conventional ionization methods, there were problems as shown in Table 2.

TABLE 2

| Method | Problem |
|---|---|
| Ion impact + chemical ionization | Poor operability, and poor sensitivity of electron impact method |
| Atmospheric pressure + electron impact ionization | Poor sensitivity of electron impact method |
| Ion attachment (Bombick) + electron impact ionization | Poor operability, poor sensitivity of both methods, and poor detection of molecular weight |

Here, a more detailed explanation will be given of the problems of the composite system of Bombick ion attachment and electron impact ionization. In this system, the two ionizations are performed using the same filament, so it is impossible to simultaneously measure the molecular weight and analyze the structure. Even when switching, it is necessary to change the settings of the pressure of the detected gas or the power and voltage of the filament, so the operability is poor. Further, under the electron emission conditions, the temperature of the alkali metal oxide becomes considerably high, a large amount of alkali metal is emitted, and the problems of contamination or lifetime become serious. Further, since the region of attachment of ions is sealed, the detected gas to which the metal ions are attached cannot be efficiently drawn out and the sensitivity of the ion attachment ionization method is low. Further, since there is an alkali metal oxide with a large heat capacity at the center of the filament, electrons are not emitted from there and the sensitivity of the electron impact ionization method also becomes low. Further, while the reasons are not necessarily clear, if the voltage of the emitter is made to be more than 5V in the ion attachment ionization method, the molecule peaks are reduced and fragment peaks appear. Therefore, the reliability at the measurement of the molecular weight becomes extremely low.

SUMMARY OF THE INVENTION

An object of the present invention is to provide a mass spectrometry apparatus, which can accurately measure the molecular weight of molecules of a detected gas with a sufficient sensitivity and preferably simultaneously analyze the molecular structure with a sufficient sensitivity.

The mass spectrometry apparatus according to the present invention is configured as follows to achieve the above object.

The mass spectrometry apparatus according to the present invention is provided with an ion source for ionizing a detected gas, a mass spectrometry mechanism for analysis of the mass of the ionized detected gas, and a vacuum pump for evacuating these. The mass spectrometry apparatus is further provided independently with two independent ion sources, that is, a first ion source for attaching positive charge metal ions for ionization and a second ion source for causing electrons to impact for ionization. The molecular weight of the detected gas is measured accurately and with a high sensitivity by analyzing the ions of the detected gas produced by the first ion source based on the ion attachment ionization at the mass spectrometry mechanism. Further, the molecular structure is analyzed with a high sensitivity by analyzing the ions of the detected gas produced at the second ion source based on the electron impact ionization at the mass spectrometry mechanism. Due to the above configuration, it is possible to measure the molecular weight of the detected gas and analyze the molecular structure simultaneously or separately with high sensitivities.

In the above configuration, preferably the second ion source is positioned between the first ion source and the mass spectrometry mechanism and the detected gas is introduced to the first ion source.

In the above configuration, a quadrapole or ion trap type mechanism is used for the mass spectrometry mechanism. An ion trap mass spectrometry mechanism has an internal ionization structure comprised combined with the second ion source. As the detected gas introduced to the first ion source, there is a gas ejected from a gas chromatograph or a liquid chromatograph. Further, the metal ions are any of $Li^+$, $K^+$, $Na^+$, $Rb^+$, $Cs^+$, $Al^+$, $Ga^+$, and $In^+$.

The mass spectrometry apparatus according to the present invention is realized by improving the above conventional ion attachment ionization method. In the past, it had been considered that ion attachment ionization could only be applied to specific types of measurement for research purposes, but the inventor discovered that the ion attachment ionization method can be broadly used for general, practical analysis of gas and other mass spectrometry. When using a mass spectrometry apparatus using the ion attachment ionization method of the present invention for actual measurement of the easily disassociable acetone or $C_4F_8$, only complete molecule peaks appear and no fragments can be observed at all. Further, since the pressure of the ion source is three orders lower than the atmospheric pressure ionization method, there is almost no occurrence of clusters. Further, depending on the specimen, it was learned that it is not necessarily essential to lower the concentration of the detected gas.

The mass spectrometry apparatus according to the present invention can give a good measurement sensitivity as explained above. $C_4F_8$ is a gas extremely often used as an industrial use gas for semiconductors etc. A look by molecular characteristics shows that the polarity is low (little concentration of charges) and the electron affinity is large (negative charge electrons are strongly attracted). Therefore, it had been thought that the positive charge ions would not easily attach and that a sufficient sensitivity could not be obtained by the ion attachment ionization method. When using the ion attachment ionization apparatus of the present invention to actually measure $C_4F_8$, however, a sufficient sensitivity of the ppb level was obtained. Further, a sensitivity of the ppm level was actually obtained for non-polar $N_2$, for which the sensitivity should be the worst.

The reason why the high sensitivity is achieved by the mass spectrometry apparatus according to the present invention is believed to be as follows. In the electron impact ionization method or other methods, there is a large background due to the light emitted from the ion source. Further, the background increases in proportion to the amount of the signal. Therefore, it is not possible to sufficiently increase the sensitivity in practice. As opposed to this, with the ion attachment ionization method, since the emitter temperature is low, there is almost no background due to the radiated light. Therefore, the increase in the signal due to the improvement in the ion source contributes to the improvement of the sensitivity as it is.

Due to the above, according to the ion attachment ionization method newly developed by the present invention, it becomes possible to realize a mass spectrometry apparatus for measuring the accurate molecular weight of the gas molecules with a sufficient sensitivity.

Further, the mass spectrometry apparatus according to the present invention can analyze the molecular structure as explained below.

In the past, the simplest, most reliable way to analyze the molecular structure is to use the electron impact ionization method. The electron impact ionization method is therefore combined inside the apparatus for the ion attachment ionization method. As explained above, however, a conventional apparatus combining the electron impact ionization method with the chemical ionization method or atmospheric pressure ionization method was always low in operability or sensitivity. As opposed to this, the inventor discovered the following three advantages obtained by combining the electron impact ionization method with the ion attachment ionization method.

First, it is possible to introduce 100% detected gas in the ion source. That is, there is no need to dilute it with a reaction gas or carrier gas etc.

Second, the pressure of the ion source becomes a low pressure of 100 Pa. That is, the pressure of the ion source is $10^{-3}$ times in comparison with the atmospheric pressure ionization method.

Third, it is possible to close off the ion source except for the ion passage port. As opposed to this, an electron passage port is required in the chemical ionization method.

By utilizing the advantages of the ion attachment ionization method, a combination with the electron impact ionization method which solves the above problems can be achieved.

BRIEF DESCRIPTION OF THE DRAWINGS

These and other objects and features of the present invention will become clearer from the following description of the preferred embodiments given with reference to the attached drawings, in which.

DESCRIPTION OF THE PREFERRED EMBODIMENTS

Preferred embodiments of the present invention will be explained next with reference to the attached drawings.

Figure 1:
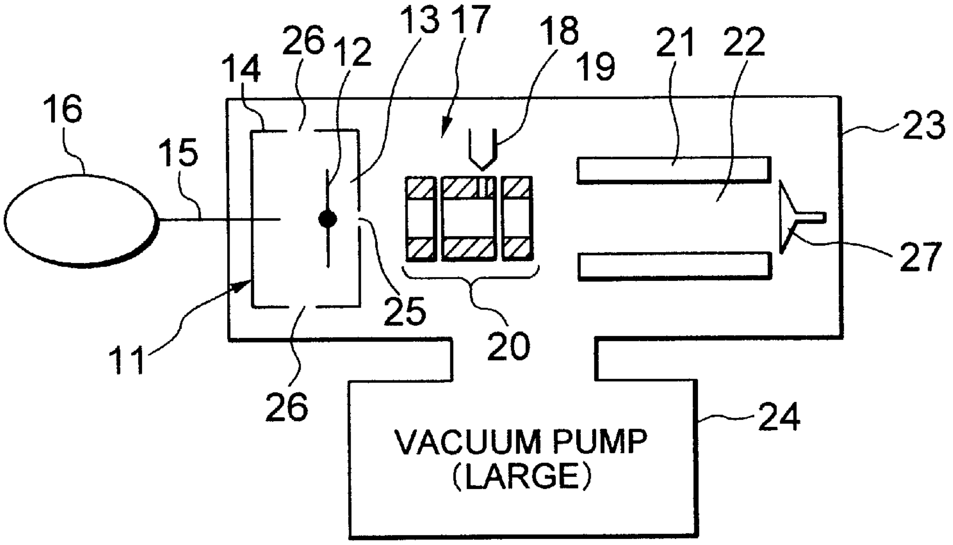
FIG. 1 is a schematic view of the configuration of a first embodiment of a mass spectrometry apparatus according to the present invention.

FIG. 1 shows a first embodiment of a mass spectrometry apparatus according to the present invention. It schematically shows the internal configuration of the mass spectrometry apparatus. Reference numeral 11 shows a first ion source of the ion attachment ionization method, 12 shows an Li oxide emitter (strictly speaking, the straight line part shows the power line, while the black circular part shows the emitter), 13 shows a region where the ions attach to the detected gas (attachment region), 14 shows a partition surrounding the attachment region 13, 15 shows piping for introduction of the detected gas, and 16 shows a container in which the detected gas is contained. Reference numeral 17 shows a second ion source for the electron impact ionization method, 18 shows a filament, 19 shows a region where the electrons impact the detected gas (impact region), and 20 shows a condensing lens configured by three cylinders. Reference numeral 21 shows a quadrapole mass spectrometry mechanism for the analysis of the mass of the detected gas, 22 shows a region where the mass is analyzed (analysis region), 23 shows a vacuum chamber, 2 shows a relatively large sized vacuum pump, and 27 shows a detector.

Before measurement, the entire inside of the vacuum chamber 23 including the first ion source 11, the second ion source 17, and the quadrapole mass spectrometry mechanism 21 is evacuated by the vacuum pump 24 to a pressure of not more than $10^{-4}$ Pa.

In the above configuration, a power source for heating the ion attachment emitter 12 is provided at the emitter. A power source for heating the electron impact filament 18 is provided at the filament as well. In FIG. 1, however, these power sources are not illustrated.

First, an explanation will be made of the measurement of the molecular weight of the detected gas. The molecular weight is measured as follows. First, the detected gas is introduced into the attachment region 13 through the piping 15. The pressure of the detected gas at the attachment region 13 is made 100 Pa. The emitter 12 is heated to about 600° C., whereby $Li^+$ is emitted. The $Li^+$ attaches to the molecules of the detected gas at the attachment region 13, whereby the molecules of the detected gas are charged positively as a whole.

The molecules of the detected gas to which the $Li^+$ is attached have excess energy immediately after attachment and are unstable in state. When the pressure is 100 Pa, however, the mean free path of the gas molecules is about 0.07 mm. The $Li^+$ collides with the gas molecules as much as $10^7$ times per second. Therefore, the excess energy is stripped immediately from the large number of colliding gas molecules resulting in stable molecules of detected gas with $Li^+$ attached.

A voltage of +20V is applied to the emitter 12, while a voltage of +10V is applied to the partition 14. Further, the cylinders of the two ends of the condensing lens 20 are held at 0V, while a voltage of +10V is applied to the center cylinder. Note that in FIG. 1, the illustration of the power source for applying a predetermined voltage to the parts is omitted. The center potential of the quadrapole mass spectrometry mechanism 21 is 0V. The molecules of the detected gas with the $Li^+$ attached are attracted by the electric field formed by the partition 14 and the left end cylinder of the condensing lens 20 and drawn out in the right direction. The molecules of the detected gas with the $Li^+$ attached entering into the condensing lens 20 are condensed by the plus potential of the center cylinder, then enter the quadrapole mass spectrometry mechanism 21.

The partition 4 is formed with openings 26 (for example, about 10 holes of diameters of 1 mm) in addition to the ion passage port 25. The conductance is about 1 l/s ("l" is liter). The volume of the attachment region 13 is about 0.1 l, so the gas of the attachment region 13 is replaced every 0.1 second. Due to this, it is possible to obtain a sufficient background and response for the detected gas.

For the vacuum pump 24, an extremely large one with an evacuation rate of about $10^5$ l/s is used. Therefore, the pressure at other than the attachment region 13 in the vacuum chamber 23 including the second ion source 17 becomes $10^{-3}$ Pa due to the detected gas leaking from the partition 14. The pressure is found from the following equation:

Pressure at other than attachment region=pressure of attachment region (13)×conductance÷evacuation rate With the above pressure, the mean flight path of the gas becomes about 7 m, so the molecules of the detected gas with the $Li^+$ attached proceeds without colliding much at all with the gas outside the attachment region. Therefore, the translational energy in the right direction in the quadrapole mass spectrometry mechanism 21 of the molecules of the detected gas with the $Li^+$ attached becomes the difference with the potential of the partition 14, that is, 10 eV.

The molecules of the detected gas with the $Li^+$ attached are analyzed for mass by the quadrapole mass spectrometry mechanism 21. The mass spectra obtained by this includes a molecule peak of the molecular weight of the detected gas plus 7 amu (atomic mass unit). In this way, the molecular weight of the detected gas is measured with a good sensitivity by the ion attachment ionization method.

Next, an explanation will be given of the analysis of the molecular structure of the detected gas. The molecular structure of the detected gas is analyzed as follows. The heating of the ion attachment emitter 12 is stopped and the heating of the electron impact filament 18 is started in the state while measuring the molecular weight. The filament 18 is heated to about 1800° C., whereby hot electrons are emitted. The filament 18 is given a voltage of −60V. A hole is formed near the right end of the center cylinder of the condensing lens 20. The front end of the filament 18 matches with this hole. The potential of the center cylinder is +10V, so the electrons fly through the region in the center cylinder, that is, the impact region 19, due to the translational energy of 70 eV.

The impact region 19 of the second ion source 17 becomes a pressure of $10^{-3}$ Pa due to the 100% detected gas. Therefore, the electrons collide with the detected gas at a high frequency and a large amount of fragment ions are produced. The produced fragment ions are attracted by the electric field formed by the right cylinder and drawn out in the right direction and enter the quadrapole mass spectrometry mechanism 21. The translational energy of the fragment ions in the quadrapole mass spectrometry mechanism 21 becomes the difference with the potential of the center cylinder, that is, 10 eV.

The fragment ions are analyzed for mass by the quadrapole mass spectrometry mechanism 21. The mass spectra obtained in this way includes fragment peaks reflecting the molecular structure. In this way, the structure of the detected gas is analyzed with a good sensitivity by the electron impact ionization method.

In the above explanation, a description was given of the example of measuring the molecular weight and analyzing the structure separately at different times. It is also possible to perform the two completely simultaneously. In such a case, that is, when desiring to simultaneously bring out the molecule peaks and the fragment peaks in the same mass spectra, it is sufficient to simultaneously heat both of the ion attachment emitter 12 and the electron impact filament 18. Further, when measuring the molecular weight and analyzing the structure simultaneously, but desiring to differentiate between the molecule peaks and the fragment peaks, the following is performed. The first sweep heats only the ion attachment emitter 12 and causes the appearance of only the molecule peaks. This is recognized by an ordinary data processing apparatus (not shown). The second sweeps on heat the electron impact filament 18 as well, repeatedly sweep both peaks, and cumulatively add the data processing apparatus to obtain the spectra. By doing this, it is possible to differentiate the two peaks and measure with a good sensitivity.

Figure 2:
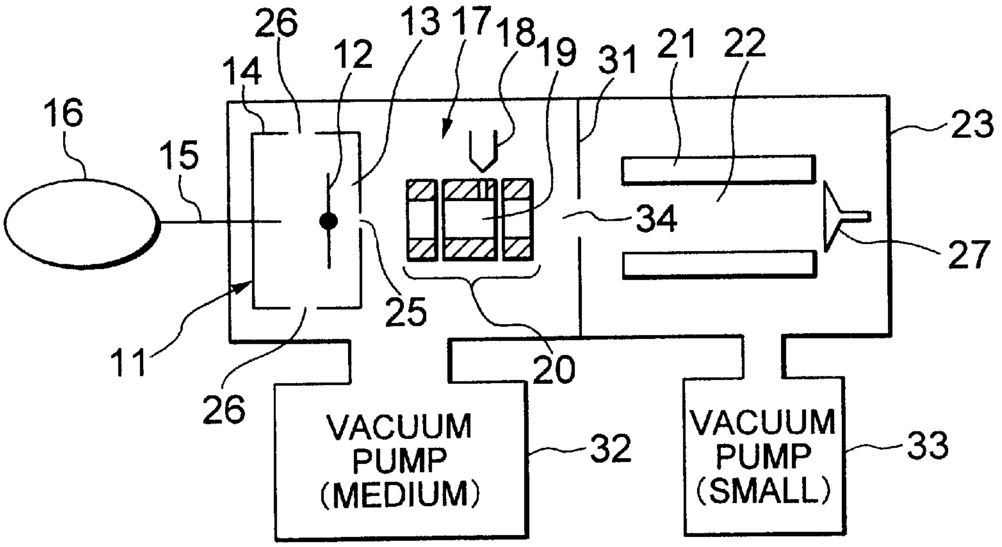
FIG. 2 is a schematic view of the configuration of a second embodiment of a mass spectrometry apparatus according to the present invention.

FIG. 2 shows a second embodiment of the mass spectrometry apparatus according to the present invention. In FIG. 2, reference numeral 31 shows a partition partitioning the space between the second ion source 17 and the quadrapole mass spectrometry mechanism 21, 32 shows a medium sized vacuum pump for evacuating the space where the first and second ion sources 14 and 17 are arranged, and 33 shows a small sized vacuum pump for evacuating the space in which the quadrapole mass spectrometry mechanism 21 is arranged. In the configuration shown in FIG. 2, elements substantially the same as the elements explained in FIG. 1 are given the same reference numerals and detailed explanations thereof are omitted.

In this embodiment, for the vacuum pump 32, use is made of one having an evacuation rate of about $10^4$ l/sec (1/10 of first embodiment). Therefore, the pressure of the second ion source 17 becomes $10^{-2}$ Pa, but the mean free path becomes about 700 mm. The molecules of the detected gas with the $Li^+$ attached proceed without colliding much with the gas. The impact region 19, however, becomes a pressure of $10^{-2}$ Pa due to the 100% detected gas, therefore more than 10 times the fragment ions are produced compared with the case of the first embodiment.

The partition 31 has an ion passage port 34 of a diameter of 10 mm and a conductance of about 10 l/sec. The evacuation rate of the vacuum pump 33 is about $10^2$ l/sec. The quadrapole mass spectrometry mechanism 21 is evacuated independently by the vacuum pump 33, so the pressure of that region becomes $10^{-3}$ Pa. This pressure is found from the equation "pressure of right side of partition=pressure of left side of partition×conductance ÷evacuation rate". Therefore, normal mass spectrometry is performed in the quadrapole mass spectrometry mechanism 21. Compared with the first embodiment, according to this embodiment, it is possible to reduce the evacuation capacity of the vacuum pump 32 corresponding to the vacuum pump 24 to 1/10th.

Figure 3:
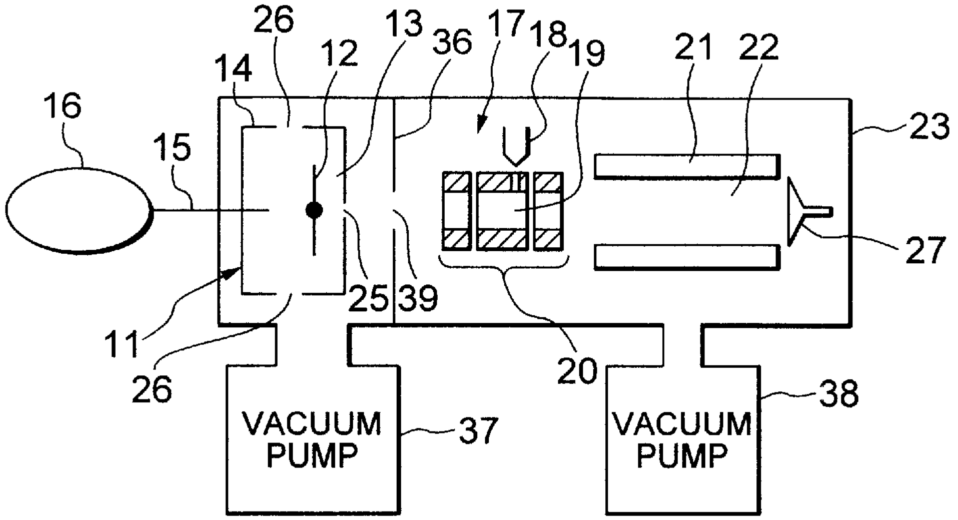
FIG. 3 is a schematic view of the configuration of a third embodiment of a mass spectrometry apparatus according to the present invention.

FIG. 3 shows a third embodiment of the mass spectrometry apparatus according to the present invention. In FIG. 3, reference numeral 36 shows a partition for partitioning the first ion source 11 and the second ion source 17, 37 shows a vacuum pump for evacuating the space where the first ion source 11 is arranged, and 38 shows a vacuum pump for evacuating the space where the second ion source 17 and the quadrapole mass spectrometry mechanism 21 are arranged. In the third embodiment, the vacuum chamber 23 is provided with a partition 36 between the first ion source 11 and the second ion source 17. The second ion source 17 and the quadrapole mass spectrometry mechanism 21 are arranged in the same space. In FIG. 3, the rest of the configuration is the same as that of the embodiments explained above. Elements substantially the same as the elements explained with reference to the above embodiments are given the same reference numerals and explanations thereof are omitted.

For the vacuum pump 37, use is made of one having an evacuation rate of about $10^3$ l/sec (1/10th that of vacuum pump 32 of second embodiment). Therefore, the pressure around the first ion source 11 becomes $10^{-1}$ Pa and the mean free path becomes about 70 mm. The distance between the first ion source 11 and the partition 36, however, is about 10 mm, so the molecules of the detected gas with the $Li^+$ attached proceed without colliding much with the gas. The partition 36 has an ion passage port 39 of a diameter of 3.3 mm and a conductance of 1 l/sec. Further, the vacuum pump 38 has an evacuation rate of about $10^{-2}$ l/sec. The second ion source 17 and the quadrapole mass spectrometry mechanism 21 are independently evacuated by the vacuum pump 38, so the pressure of that region becomes $10^{-3}$ Pa and the second ion source 17 and the quadrapole mass spectrometry mechanism 21 can operate normally.

In the third embodiment, compared with the vacuum pump of the second embodiment, it is possible to reduce the vacuum pump 37 to 1/10th. Note that the fragment peaks produced by the second ion source 17 have a sensitivity of 1/10th, the amount of the ions able to pass through the partition 36 falls, and the sensitivity of the molecule peaks falls.

Figure 4:
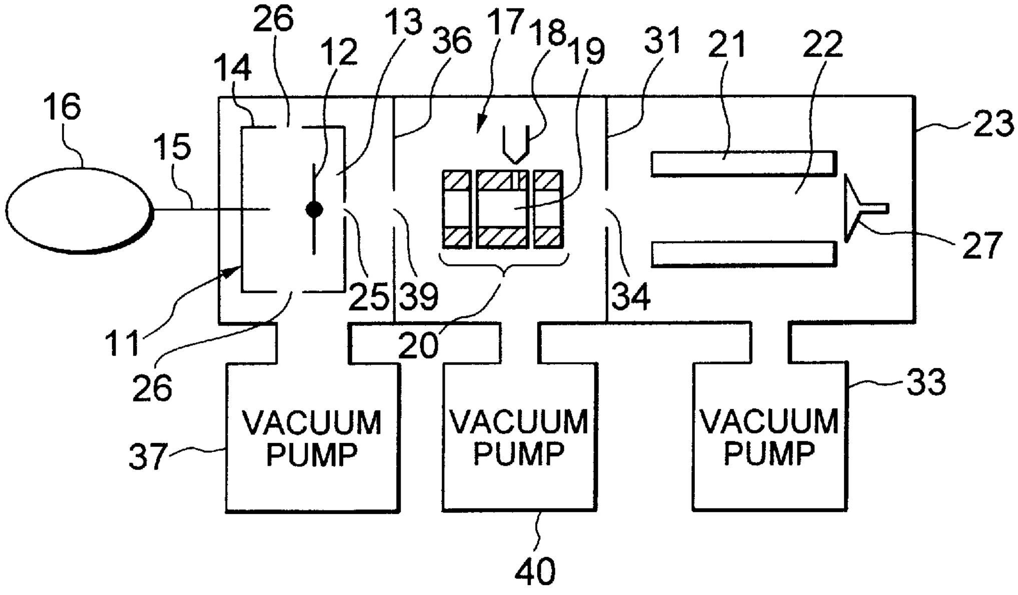
FIG. 4 is a schematic view of the configuration of a fourth embodiment of a mass spectrometry apparatus according to the present invention.

FIG. 4 shows a fourth embodiment of the mass spectrometry apparatus according to the present invention. The fourth embodiment basically has the configuration of a combination of the second embodiment and the third embodiment. Along with this, a vacuum pump 40 for evacuating the space where the second ion source is arranged is provided corresponding to that space. The rest of the configuration is the same as the configuration explained with respect to the above embodiments. Elements substantially the same as elements explained with reference to the above embodiments and already explained are given the same reference numerals and detailed explanations are omitted.

In this embodiment, however, the ion passage port of the partition 36 has a diameter of 10 mm and a conductance of about 10 l/sec. Further, the evacuation rate of the newly added vacuum pump 40 is about $10^2$ l/sec, so the pressure of the second ion source 17 becomes $10^{-2}$ Pa. In the fourth embodiment, compared with the third embodiment, the number of fragment ions produced by the second ion source 17 increases 10-fold, the amount of the ions able to pass through the partition 31 increase, and the sensitivity of the molecule peaks becomes good.

Figure 5:
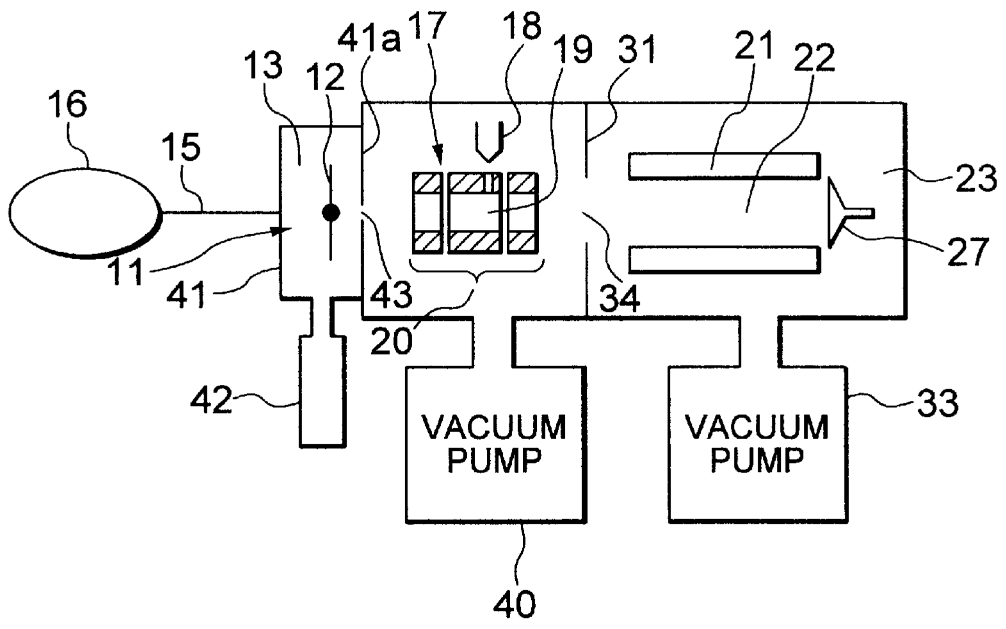
FIG. 5 is a schematic view of the configuration of a fifth embodiment of a mass spectrometry apparatus according to the present invention.

FIG. 5 shows a fifth embodiment of a mass spectrometry apparatus according to the present invention. The fifth embodiment is a modification of the fourth embodiment. In this embodiment, the characterizing feature is the provision of the first ion source 14 outside of the vacuum chamber 23 in the fourth embodiment. The rest of the configuration is substantially the same as the configuration of the fourth embodiment. In FIG. 5, reference numeral 41 is a partition surrounding the attachment region 13 of the first ion source 11 and provided outside of the vacuum chamber 23. The emitter 12 is provided inside the partition 41. A detected gas is introduced into the attachment region 13 through the piping 15 from a container containing the detected gas. A small sized vacuum pump 42 is provided at the first ion source 11. Further, the portion 41*a* of the partition 41 is formed with an ion passage port 43 between the first ion source 41*a* and the second ion source 17 inside the vacuum chamber 23. In FIG. 5, for the rest of the configuration, elements substantially the same as the elements explained in the above embodiments are given the same reference numerals and explanations are omitted.

The vacuum pump 42 is one with a small evacuation rate of about 1 l/sec. The pressure of the attachment region 13 is maintained at 100 Pa in the same way as the above embodiments. The gas is replaced in the attachment region 13 every 0.1 second in the same way as explained above. It is possible to give a sufficient background and response for the detected gas. The ion passage port 43 of the partition 41*a* has a diameter of 0.33 mm and a conductance of about 0.01 l/sec. There is no other opening in the partition. The evacuation rate of the vacuum pump 40 is about 10$^2$ l/sec, so the pressure of the second ion source 17 becomes $10^{-2}$ Pa.

The fifth mass spectrometry apparatus enables the evacuation rate of the vacuum pump 42 for evacuating the first ion source 11 to be made smaller than the fourth embodiment. On the other hand, the amount of ions which can pass through the ion passage port 43 of the partition 41*a* declines and the sensitivity of the molecule peaks is reduced.

Figure 6:
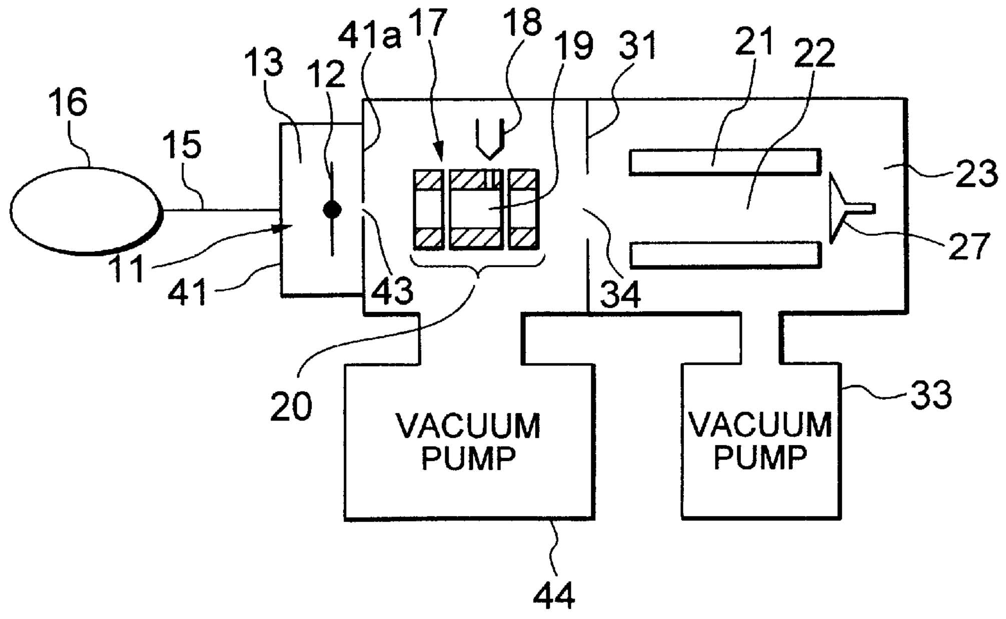
FIG. 6 is a schematic view of the configuration of a sixth embodiment of a mass spectrometry apparatus according to the present invention.

FIG. 6 shows a sixth embodiment of a mass spectrometry apparatus according to the present invention. The sixth embodiment is a modification of the fifth embodiment. It is characterized in that instead of providing the vacuum pump 42 of the fifth embodiment, a large vacuum pump 44 for evacuating the space in which the second ion source 17 is arranged is provided and the spaces of the first ion source 11 and the second ion source 17 are evacuated by the vacuum pump 44. The rest of the configuration is the same as that of the fifth embodiment. In FIG. 6, elements substantially the same as the elements shown in FIG. 5 are given the same reference numerals and explanations are omitted.

The ion passage port 43 of the partition portion 41*a* between the first ion source 11 and the second ion source 17 has a diameter of 1 mm and a conductance of 0.1 l/sec. The evacuation rate of the vacuum pump 44 is about $10^3$ l/sec. The pressure of the second ion source 17 becomes $10^{-2}$ Pa. Note that since no special vacuum pump is provided for the first ion source 11, the gas of the attachment region 13 is replaced every 1 second, but there is almost no problem with normal measurement.

The detected gas which is introduced is evacuated completely through the ion passage port 43 of the partition 41*a*. Therefore, a strong viscous flow occurs near the left end of the ion passage port 43 of the partition 41a. Therefore, the molecules of the detected gas with the $Li^+$ attached are caught up in the strong viscous flow and can pass through the ion passage port 43 of the partition 41*a* efficiently. The mass spectrometry apparatus according to the sixth embodiment, compared with the fifth embodiment, does not require a vacuum pump 42 particularly for a first ion source 11, has an increased amount of the ions which can pass through the ion passage port 43 of the partition 41*a,* and has an improved detection sensitivity of the molecule peaks.

Figure 7:
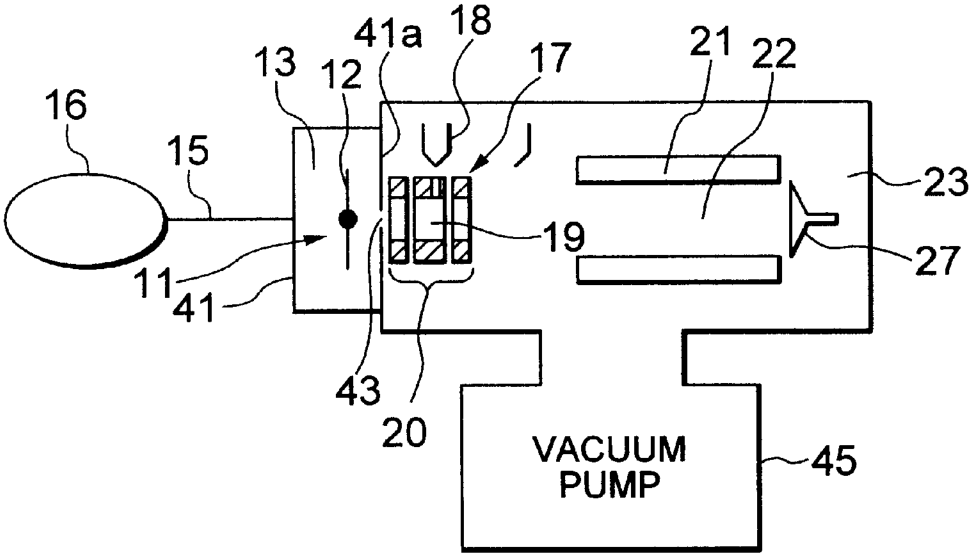
FIG. 7 is a schematic view of the configuration of a seventh embodiment of a mass spectrometry apparatus according to the present invention.

FIG. 7 shows a seventh embodiment of the mass spectrometry apparatus according to the present invention. This embodiment is a modification of the sixth embodiment. In this embodiment, no partition is provided inside the vacuum chamber 23. The chamber is formed as a single space. A large sized vacuum pump 45 is provided for evacuating the space. Further, a condensing lens 20 is arranged near the partition 41*a* at the side of the vacuum chamber 23. The rest of the configuration is the same as that of the sixth embodiment. In FIG. 7, elements substantially the same as the elements shown in FIG. 6 are given the same reference numerals and detailed explanations are omitted.

The second ion source 17 is produced to be shorter in the axial direction of the condensing lens 20. The condensing lens 20 is positioned near the outlet of the ion passage port 43 of the partition 41*a*. Further, the space where the second ion source 17 and the quadrapole mass spectrometry mechanism 21 are arranged is evacuated by only a single vacuum pump 45.

In the configuration of the seventh embodiment, since the vacuum chamber 23 is evacuated by a large sized vacuum pump 45 with a large evacuation capacity, there is a large pressure difference before and after the partition 41*a*. Therefore, the detected gas ejected from the ion passage port 43 forms a strong jet stream, that is, a flow concentrated in a narrow angle in the forward direction. Therefore, the pressure (concentration of detected gas) becomes locally high near the outlet of the ion passage port 43 of the partition 41*a*. On the other hand, the further from the outlet of the ion passage port 43, the more even and lower the pressure gradually becomes. The vacuum pump 45 has an evacuation rate of $10^4$ l/sec, so the pressure of the region of the quadrapole mass spectrometry mechanism 21 becomes $10^{-3}$ Pa, but becomes about $10^{-2}$ Pa in the region of the second ion source 17.

The mass spectrometry apparatus according to the seventh embodiment, compared with the sixth embodiment, enables the number of the vacuum pumps to be reduced while maintaining the sensitivity of the fragment peaks as it is, enables the configuration to be simplified, and enables a reduction in cost.

Figure 8:
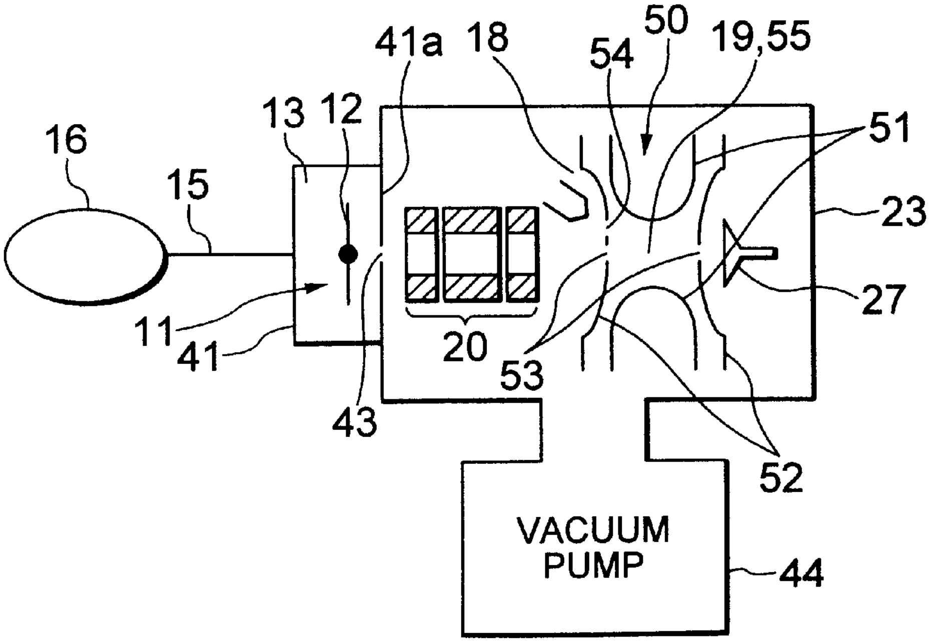
FIG. 8 is a schematic view of the configuration of an eighth embodiment of a mass spectrometry apparatus according to the present invention.

FIG. 8 shows an eighth embodiment of the mass spectrometry apparatus according to the present invention. In this embodiment, the characterizing feature is that an ion trap mass spectrometry mechanism is used as the mass spectrometry mechanism. In FIG. 8, elements substantially the same as elements explained in the above embodiments are given the same reference numerals and explanations are omitted.

In FIG. 8, reference numeral 50 shows an ion trap mass spectrometry mechanism, 51 shows a donut-shaped ring electrode, 52 shows dome- or hill-shaped end cap electrodes, 53 shows holes on the center axis of the end cap electrodes, 54 shows a hole formed at a position away from the center axis of the end cap electrodes, and 55 shows a region where the mass is analyzed (analysis region). In this embodiment, the condensing lens 20 and the ion trap mass spectrometry mechanism are arranged so that their center axes coincide. The filament 18 is not positioned on the center axis of the end cap electrodes 52, but is positioned on the extension of the line connecting the center point of the mass spectrometry mechanism 50 and the hole 54. The electrons emitted from the filament 18 are driven into the analysis region 55 through the hole 54 where they are ionized by electron impact. Therefore, in the mass spectrometry apparatus according to the present embodiment, the impact region 19 and the analysis region 55 match. The second ion source is comprised of the filament 18, the hole 54 not on the center axis, and the impact region 19 (analysis region 55). The mass spectrometry apparatus having the ion trap mass spectrometry mechanism according to the present embodiment has an internal ionization structure. Therefore, in the present embodiment as well, the condensing lens 20 is used, but the condensing lens strictly speaking differs from the configuration of the above embodiments and has the impact region formed inside it.

The first ion source 11, the introduction use piping 15, the container 16 containing the detected gas, the partitions 41, 41*a,* the ion passage port 43, and the vacuum pump 44 are the same as those explained in the sixth embodiment. Note that since there is no vacuum pump 33, the pressure of the impact region 19 (analysis region 55) becomes $10^{-2}$ Pa. Further, the pressure of the analysis region 55 also becomes $10^{-2}$ Pa. In the ion trap mass spectrometry mechanism 50, operation is possible even at $10^{-2}$ Pa, so normal mass analysis is possible.

Figure 9:
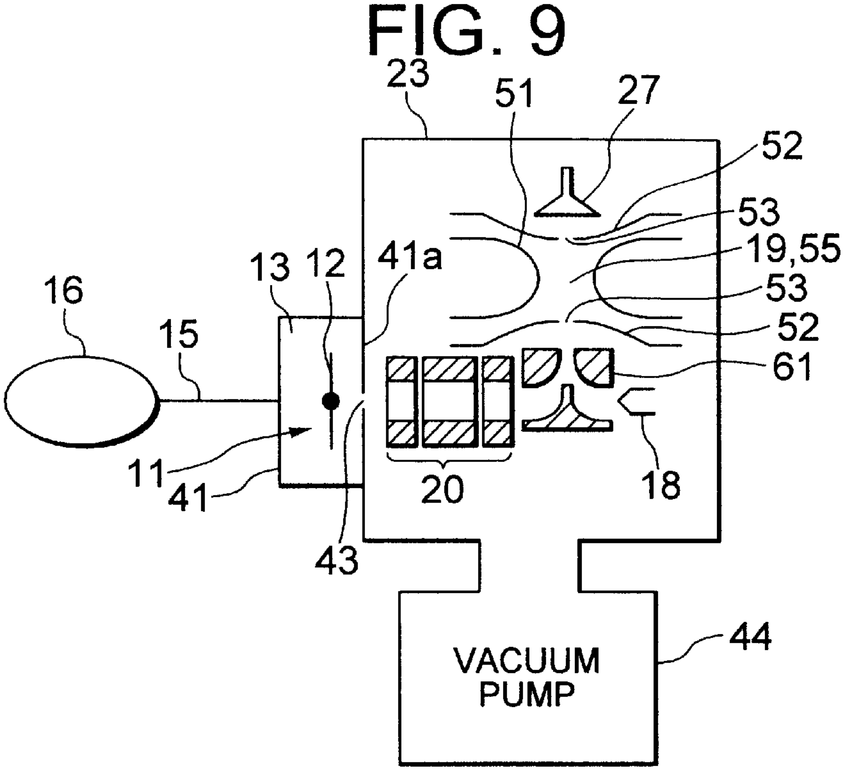
FIG. 9 is a schematic view of the configuration of a ninth embodiment of a mass spectrometry apparatus according to the present invention.

FIG. 9 shows a ninth embodiment of the mass spectrometry apparatus according to the present invention. This embodiment is a modification of the mass spectrometry apparatus having the ion trap mass spectrometry mechanism explained in the eighth embodiment. In FIG. 9, elements substantially the same as the elements explained with reference to FIG. 8 are given the same reference numerals and detailed explanations are omitted. In this embodiment, the condensing lens 20 and the ion trap mass spectrometry mechanism are arranged in a positional relationship whereby their center axes become substantially perpendicular. Therefore, in this embodiment, an electrostatic deflector 61 is provided between the condensing lens 20 and the ion trap mass spectrometry mechanism 50. The electrostatic deflector 61 has two inlets and a single outlet. The outlet of the condensing lens 20 is made to face one inlet so that the ions enter it. The filament 18 is arranged at the other inlet. The paths from the two inlets converge midway and lead to the outlet. The rest of the configuration is the same as the configuration of the eighth embodiment.

In this embodiment as well, there is an internal ionization structure. The ions of the molecules of the detected gas from the outlet side of the condensing lens 20 are deflected in direction of advance by the electrostatic deflector 61 to the ion trap mass spectrometry mechanism 50. In FIG. 9, the ions flying in from the left and the electrons flying in from the right are both deflected 90 degrees by the electrostatic deflector 61 and pass through the hole 53 on the center axis of the ion trap mass spectrometry mechanism 50 to be introduced to the impact region 19 (analysis region 55). According to the above ninth embodiment, compared with the eighth embodiment, the electrons pass over the center axis of the quadrapole electric field where the high frequency electric field is 0, so the electron loss can be reduced.

Figure 10:
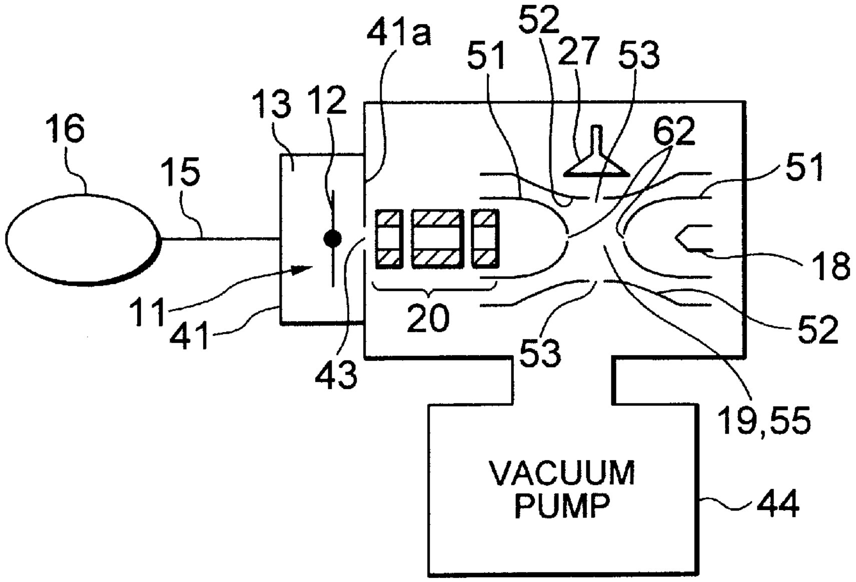
FIG. 10 is a schematic view of the configuration of a tenth embodiment of a mass spectrometry apparatus according to the present invention.
Figure 11A:
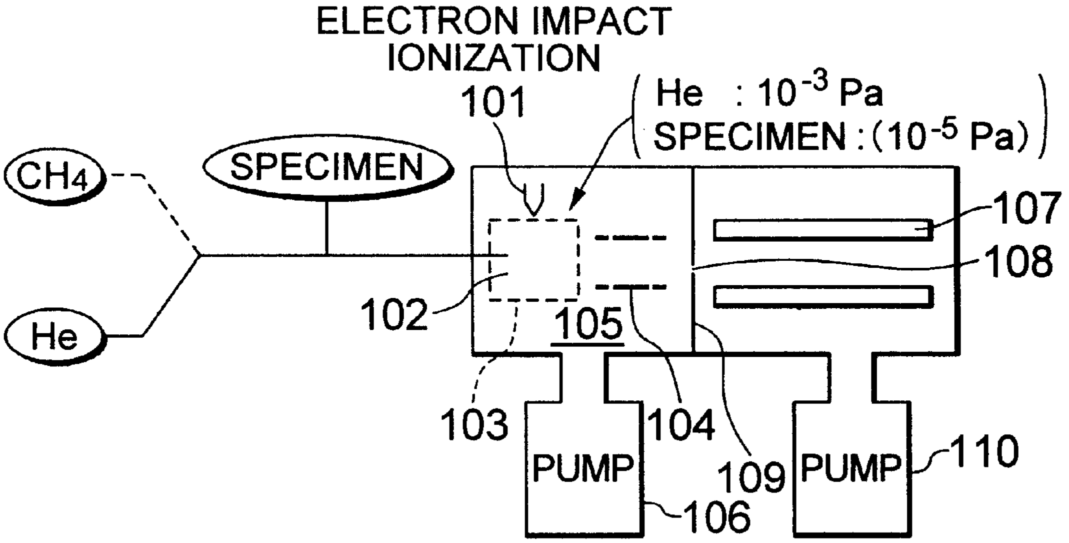
FIG. 11A is a schematic view of the configuration of a mass spectrometry apparatus of the related art combining electron impact ionization and chemical ionization.
Figure 11B:
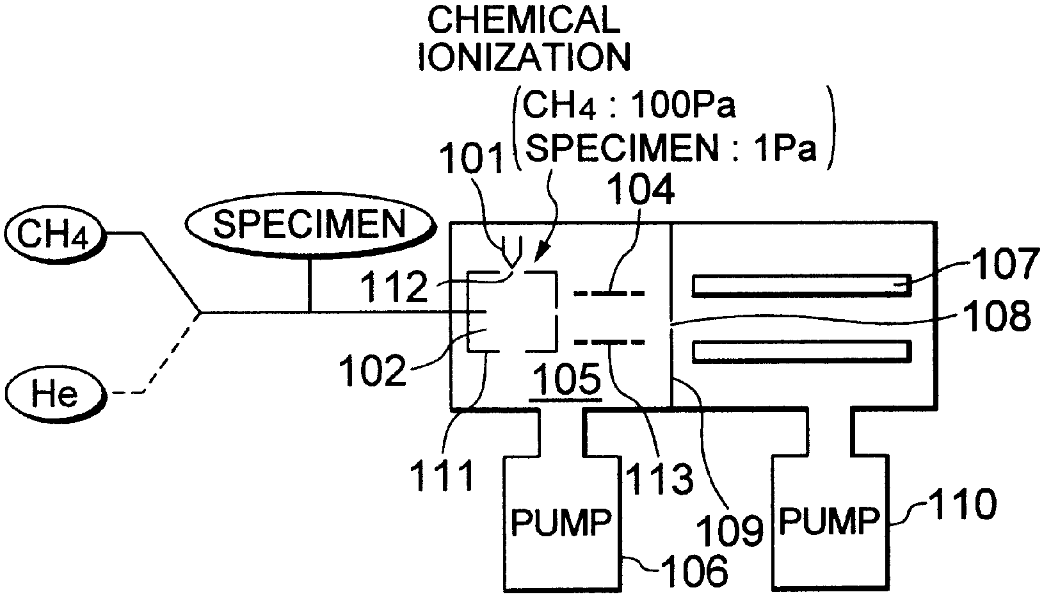
FIG. 11B is a schematic view of the configuration of a mass spectrometry apparatus of the related art combining electron impact ionization and chemical ionization.
Figure 12:
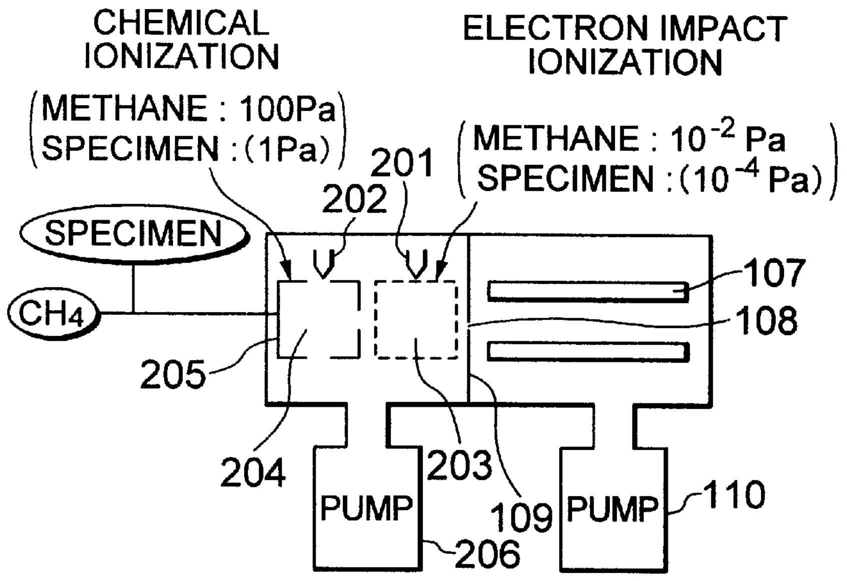
FIG. 12 is a schematic view of the configuration of a mass spectrometry apparatus of the related art combining electron impact ionization and chemical ionization.
Figure 13:
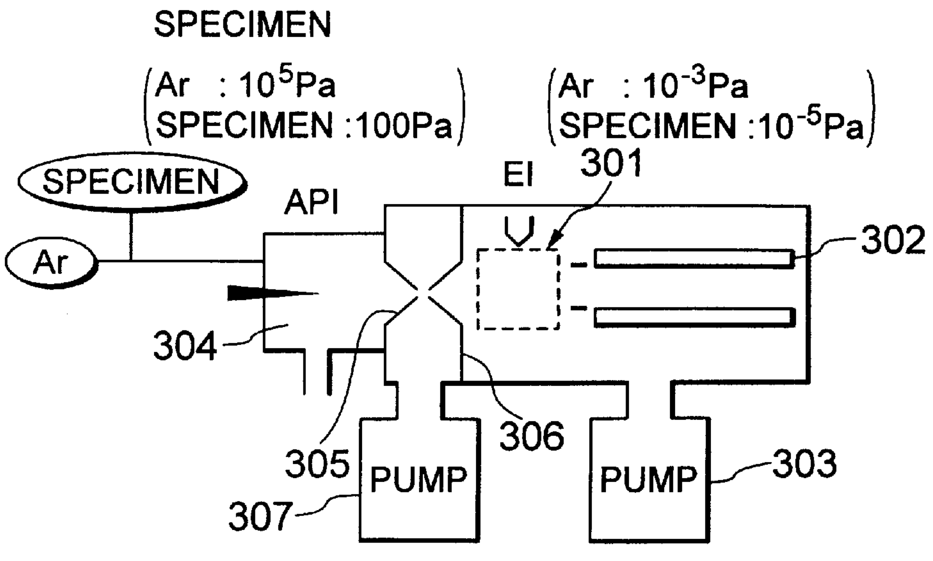
FIG. 13 is a schematic view of the configuration of a mass spectrometry apparatus of the related art combining electron impact ionization and atmospheric pressure ionization.
Figure 14:
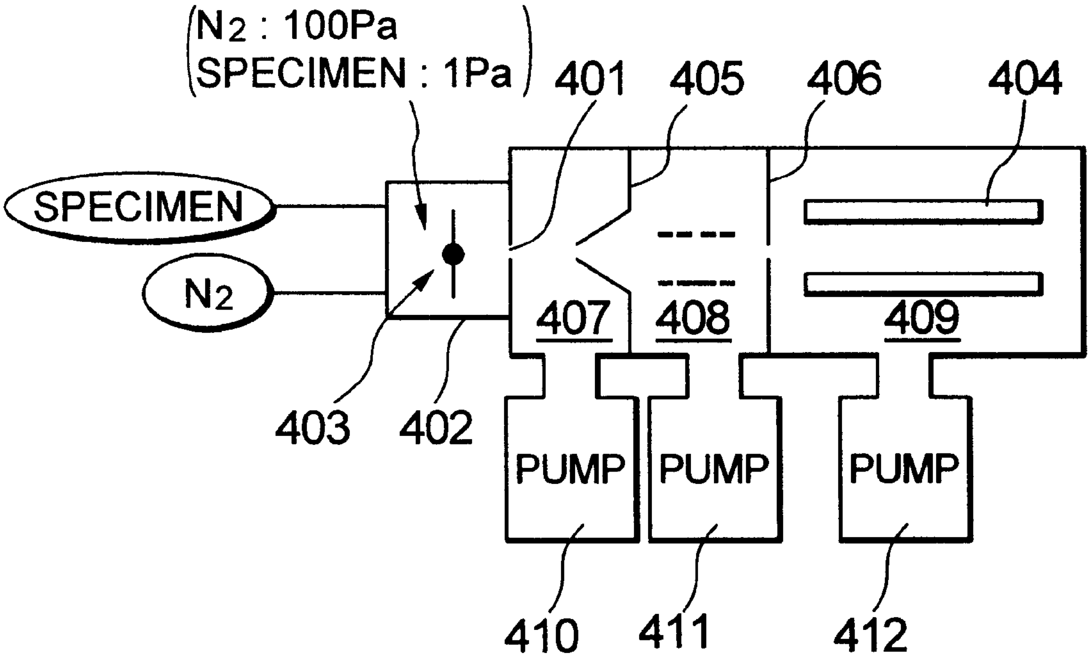
FIG. 14 is a schematic view of the configuration of a mass spectrometry apparatus of the related art showing the ion attachment ionization of Fujii.

FIG. 10 shows a 10th embodiment of a mass spectrometry apparatus according to the present invention. The 10th embodiment is a modification of the eighth embodiment and has an internal ionization structure. In this embodiment, compared with the eighth embodiment, the orientation of the ion trap mass spectrometry mechanism 50 is rotated 90 degrees and the ring-shaped electrode 51 is arranged horizontal in posture. Therefore, the center axis of the ion trap mass spectrometry mechanism 50 and the axis passing through the centers of the end cap electrodes 52 become perpendicular in FIG. 10. In this ion trap mass spectrometry mechanism 50, holes 62 are formed at locations of the two end cap electrodes 52 on the line of extension of the condensing lens 20 and the filament 18 is arranged at a position on the line of extension at the opposite side of the condensing lens 20. Further, the detector 27 is arranged at a position outside the hole 53 of the top end cap electrode 52. The rest of the configuration is the same as that of the eighth embodiment. Therefore, in FIG. 10, elements substantially the same as the elements explained in the eighth embodiment are given the same reference numerals.

According to the configuration of the 10th embodiment, in the ion trap mass spectrometry mechanism 50, the ions flying in from the condensing lens 20 positioned at the left side and electrons flying in from the filament 18 positioned at the right side are introduced through the hole 62 to the impact region 19 (analysis region 55). According to the configuration of this embodiment, there is the advantage of the lack of need for the above electrostatic deflector. Note that in the case of this embodiment, a high frequency voltage is applied to the ring electrode, so the ions and electrons are intermittently introduced in synchronization with the period of the high frequency wave or the energy is changed matching with the change in the high frequency voltage.

The above explanation was given with reference to first to 10th embodiments, but the mass spectrometry apparatus of the present invention is not limited to these embodiments. For example, the closed first ion source in the fifth to the seventh embodiments is not limited to those apparatuses and may be broadly applied to apparatuses of other configurations as well including the first to fourth embodiments.

The pressures of the different regions change considerably depending on the type of the detected gas, the object of measurement, the structure, and the mechanism. For example, the pressure of the attachment region which had been made 100 Pa may change between 10 to 1000 Pa, the pressure of the impact and attachment region which had been made $10^{-2}$ Pa may change between $10^{-1}$ to $10^{-3}$ Pa, and the pressure of the region of the quadrapole mass spectrometry mechanism which had been made $10^{-3}$ Pa may change between $10^{-1}$ to $10^{-4}$ Pa. The actual magnitudes of the area of the ion passage port of the partition and the evacuation rate of the vacuum pump change depending on these values.

The explanation was also made of a general vacuum pump having a single intake port at a single discharge portion, but it may also be made a multi-type with two or more intake ports at a single discharge portion. Further, in a for example turbo molecular pump (TMP), the gas is compressed by 10 or so vanes, but it is possible to position the main intake port at the final end of the vanes to evacuate by a higher compression ratio by all of the vanes or to position the secondary intake port at the middle of the vanes and evacuate by the vanes after that by a lower compression ratio. By doing this, it is possible to make the evacuation operations and capabilities independent and obtain the same effect as if using two separate pumps. Therefore, in the present invention, multi-type vacuum pumps may be used for all or part of the first to fourth vacuum pumps and the actual number of vacuum pumps can be reduced.

The explanation was made of only the detected gas as the introduced gas, but in the case of a detected gas which could damage the emitter and has a sufficient concentration and sensitivity, it is also possible to simultaneously introduce a dilution gas. Further, it is possible to connect the apparatus of the present invention to a gas chromatograph, for example, a gas chromatograph/mass spectrometry (GC/MS) apparatus or liquid chromatograph/mass spectrometry (LC/MS) apparatus.

In this case, as the dilution or carrier gas, a gas should be employed which does not have an effect on the measurement of the detected gas. For example, if He is used, the peak of He by the electron impact ionization method becomes 4 amu. With the ion attachment ionization method, however, the detected gas always has a peak with 7 amu (in case of $Li^+$) added, so it never interferes with the measurement of the molecular weight. Further, when desiring to use $N_2$ due to cost factors etc., it is sufficient to use a $K^+$ emitter. With this combination, the peak of $N_2$ by the electron impact ionization method becomes 28 amu, but since 39 amu are added with the ion attachment ionization method, there is no interference.

The emitter for the ion attachment ionization method was explained assuming the attachment of a spherical metal oxide to a wire-shaped filament, but it is also possible to use various other shapes and structures such as a filament coated with a thin film of a metal oxide or a hot plate instead of the filament. Further, while the explanation was given of the filament and the condensing lens for the electron impact ionization as an integral member, it is also possible to make these separate and independent.

Further, while the explanation was given with reference to $Li^+$ as the attached metal ions, it is also possible to use alkali metal ions such as $K^+$, $Na^+$, $Rb^+$, and $Cs^+$ or other metal ions such as $Al^+$, $Ga^+$ and $In^+$. Further, in the first to seventh embodiments, the explanation was given with reference to a quadrapole mass spectrometry mechanism as the mass spectrometry mechanism, but it is also possible to use an external ion trap (three-dimensional mass spectrometry mechanism) type mass spectrometry mechanism, magnetic field sector type mass spectrometry mechanism, or time-of-flight (TOF) type mass spectrometry mechanism.

Further, while the explanation was given with reference to gaseous specimens to be measured, but the specimen itself may also be solid or liquid. It is also possible to convert a solid or liquid specimen to a gas by some sort of means and analyze the gas as a detected gas.

According to the present invention, it is possible to provide a mass spectrometry apparatus provided with a mass spectrometry mechanism for analyzing the mass of an ionized detected gas, including two ion sources, that is, a first ion source for attaching positive charge metal ions for ionization and a second ion source for causing impact of electrons for ionization. Therefore, it is possible to measure the accurate molecular weight of the molecules of the detected gas with a sufficient sensitivity and simultaneously analyze the molecular structure with a sufficient sensitivity.

While the invention has been described with reference to specific embodiment chosen for purpose of illustration, it should be apparent that numerous modifications could be made thereto by those skilled in the art without departing from the basic concept and scope of the invention.

What is claimed is:

1. A mass spectrometry apparatus including an ion source for ionizing a detected gas, a mass spectrometry mechanism for analyzing the mass of the ionized detected gas, and a vacuum pump for evacuating both insides of the ion source and the mass spectrometry mechanism, said mass spectrometry apparatus further comprising:

a first ion source for attaching positive charge metal ions to the molecules of the detected gas to ionize the detected gas, and a second ion source for causing electrons to impact the molecules of the detected gas for ionization, wherein said first ion source and said second ion source being provided independently.

2. A mass spectrometry apparatus as set forth in claim 1, wherein said second ion source is positioned between said first ion source and said mass spectrometry mechanism and said detected gas is introduced to said first ion source.

3. A mass spectrometry apparatus as set forth in claim 2, wherein a partition with an ion passage port through which the ionized detected gas passes is provided between said second ion source and said mass spectrometry mechanism, and each of said second ion source and said mass spectrometry mechanism is evacuated by an independent vacuum pump.

4. A mass spectrometry apparatus as set forth in claim 3, wherein said second ion source is arranged near said ion passage port of said partition.

5. A mass spectrometry apparatus as set forth in claim 2, wherein a partition with an ion passage port through which the ionized detected gas passes is provided between said first ion source and said second ion source, and each of said first ion source and said second ion source is evacuated by an independent vacuum pump.

6. A mass spectrometry apparatus as set forth in claim 5, wherein said partition provided between said first ion source and said second ion source is closed except for said ion passage port.

7. A mass spectrometry apparatus as set forth in claim 2, wherein partitions with ion passage ports through which the ionized detected gas passes are provided between said first ion source and said second ion source and between said second ion source and said mass spectrometry mechanism, and each of said first ion source, second ion source, and mass spectrometry mechanism is evacuated by an independent vacuum pump.

8. A mass spectrometry apparatus as set forth in claim 1, wherein said mass spectrometry mechanism is an ion trap type and has an internal ionization mechanism combined with said second ion source.

9. A mass spectrometry apparatus as set forth in claim 8, wherein a partition with an ion passage port through which an ionized detected gas passes is provided between said first ion source and said mass spectrometry mechanism, and each of said first ion source and said mass spectrometry mechanism is evacuated by an independent vacuum pump.

10. A mass spectrometry apparatus as set forth in claim 9, wherein said partition provided between said first ion source and said mass spectrometry mechanism is closed except for said ion passage port.

11. A mass spectrometry apparatus as set forth in claim 1, wherein a gas ejected from a gas chromatograph or liquid chromatograph is introduced into said first ion source.

12. A mass spectrometry apparatus as set forth in claim 1, wherein the metal ions are any of $Li^+$, $K^+$, $Na^+$, $Rb^+$, $Cs^+$, $Al^+$, $Ga^+$, and $In^+$.

13. A mass spectrometry apparatus as set forth in claim 1, wherein a pressure during the operation of said first ion source is in the range of 1 to 500 Pa.

14. A mass spectrometry apparatus as set forth in claim 1, wherein a pressure during the operation of said second ion source is not more than $1\times10^{31\ 1}$ Pa.

* * * * *